United States Patent
Jacob

(10) Patent No.: US 10,184,386 B2
(45) Date of Patent: Jan. 22, 2019

(54) PRE-CHAMBER GAS VALVE

(71) Applicant: GE Jenbacher GmbH & Co OG, Jenbach (AT)

(72) Inventor: Raphael Jacob, Pfaffenhofen (DE)

(73) Assignee: GE JENBACHER GMBH & CO OG, Jenbach (AT)

(*) Notice: Subject to any disclaimer, the term of this patent is extended or adjusted under 35 U.S.C. 154(b) by 73 days.

(21) Appl. No.: 15/050,820

(22) Filed: Feb. 23, 2016

(65) Prior Publication Data

US 2016/0252005 A1 Sep. 1, 2016

(30) Foreign Application Priority Data

Feb. 27, 2015 (AT) .............................. A 50162/2015

(51) Int. Cl.
| | |
|---|---|
| *F02B 19/10* | (2006.01) |
| *F02M 21/02* | (2006.01) |
| *F16K 1/12* | (2006.01) |
| *F16K 15/02* | (2006.01) |

(52) U.S. Cl.
CPC ....... *F02B 19/108* (2013.01); *F02M 21/0242* (2013.01); *F02M 21/0269* (2013.01); *F02M 21/0275* (2013.01); *F02M 21/0281* (2013.01); *F16K 1/126* (2013.01); *F16K 15/028* (2013.01); *Y02T 10/125* (2013.01); *Y02T 10/32* (2013.01)

(58) Field of Classification Search
CPC ...... F16K 1/126; F16K 15/028; F02B 19/108; F02M 21/0242; F02M 21/0269; F02M 21/0275

USPC .................................................. 137/540, 542
See application file for complete search history.

(56) References Cited

U.S. PATENT DOCUMENTS

| | | | | |
|---|---|---|---|---|
| 1,095,931 | A * | 5/1914 | Saxon | .................... F01B 25/00 137/542 |
| 2,667,155 | A | 1/1954 | Paluch et al. | |
| 4,389,999 | A | 6/1983 | Jaqua | |
| 4,903,656 | A | 2/1990 | Nakazono et al. | |
| 5,609,130 | A | 3/1997 | Neumann | |
| 6,354,263 | B2 | 3/2002 | Ibrahim | |
| 7,290,559 | B2 * | 11/2007 | Nieslony | .............. F02M 59/464 137/454.4 |
| 8,826,883 | B2 | 9/2014 | Ishida et al. | |
| 2002/0002962 | A1 | 1/2002 | Ibrahim | |

(Continued)

FOREIGN PATENT DOCUMENTS

| | | |
|---|---|---|
| DE | 100 20 719 | 2/2001 |
| EP | 0 480 545 | 4/1992 |

(Continued)

OTHER PUBLICATIONS

Austrian Search Report dated Aug. 18, 2015 in corresponding Austrian Application No. 50162/2015 (with English translation).

(Continued)

*Primary Examiner* — P. Macade Nichols
(74) *Attorney, Agent, or Firm* — GE Global Patent Operation; Rita D. Vacca

(57) ABSTRACT

A pre-chamber gas valve including a valve body, at least one valve spring and at least one valve needle, wherein the valve body has a lower space which is acted upon with gas in the operating condition and an upper space in which the valve spring is arranged, wherein the upper space is closed by way of a pressed plug.

10 Claims, 8 Drawing Sheets

(56) References Cited

U.S. PATENT DOCUMENTS

2011/0214639 A1    9/2011   Ishida et al.
2015/0001430 A1    1/2015   Lee et al.

FOREIGN PATENT DOCUMENTS

| EP | 2 372 135 | 10/2011 |
| GB | 2 082 251 | 3/1982 |
| JP | 4-171256 | 6/1992 |
| JP | H1047165 A | 2/1998 |
| WO | 2004/099584 | 11/2004 |
| WO | 2008/081083 | 7/2008 |

OTHER PUBLICATIONS

European Search Report dated Aug. 1, 2016 in corresponding European Patent Application No. 16 15 6820 (English translation).
Canadian Office Action issued in connection with corresponding CA Application No. 2921629 dated Sep. 1, 2017.
Machine Translation and First Office Action and Search issued in connection with corresponding CN pplication No. 201610305035.5 dated Jan. 24, 2018.

* cited by examiner

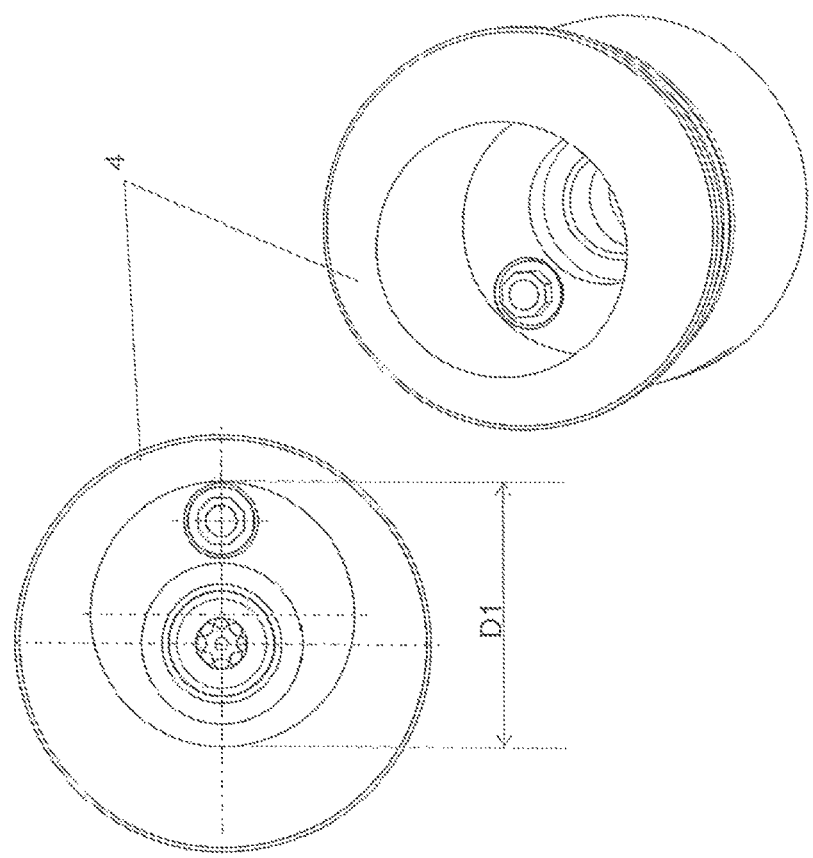
Fig. 1b
Fig. 1c
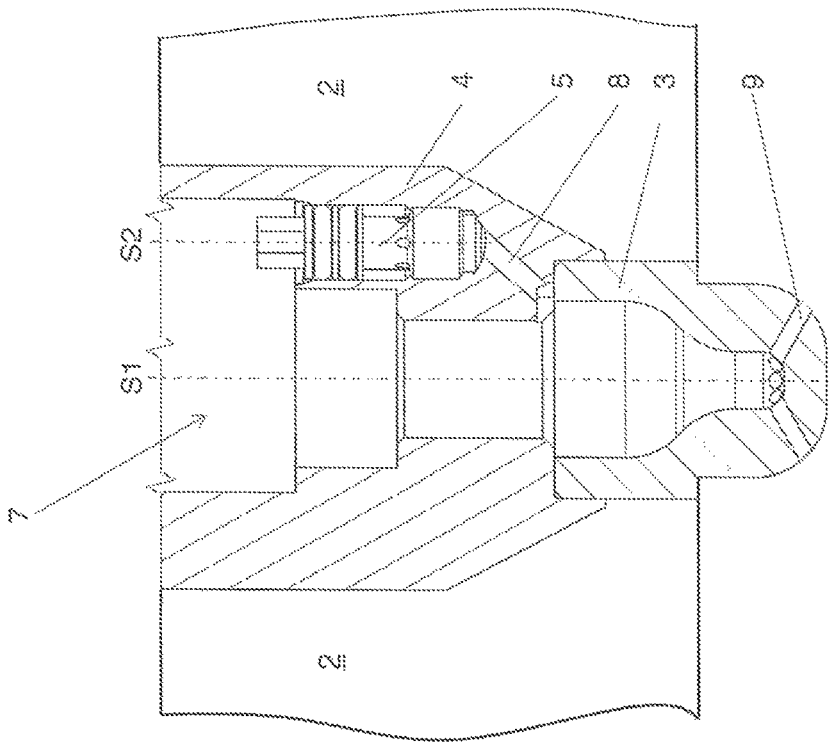
Fig. 1a

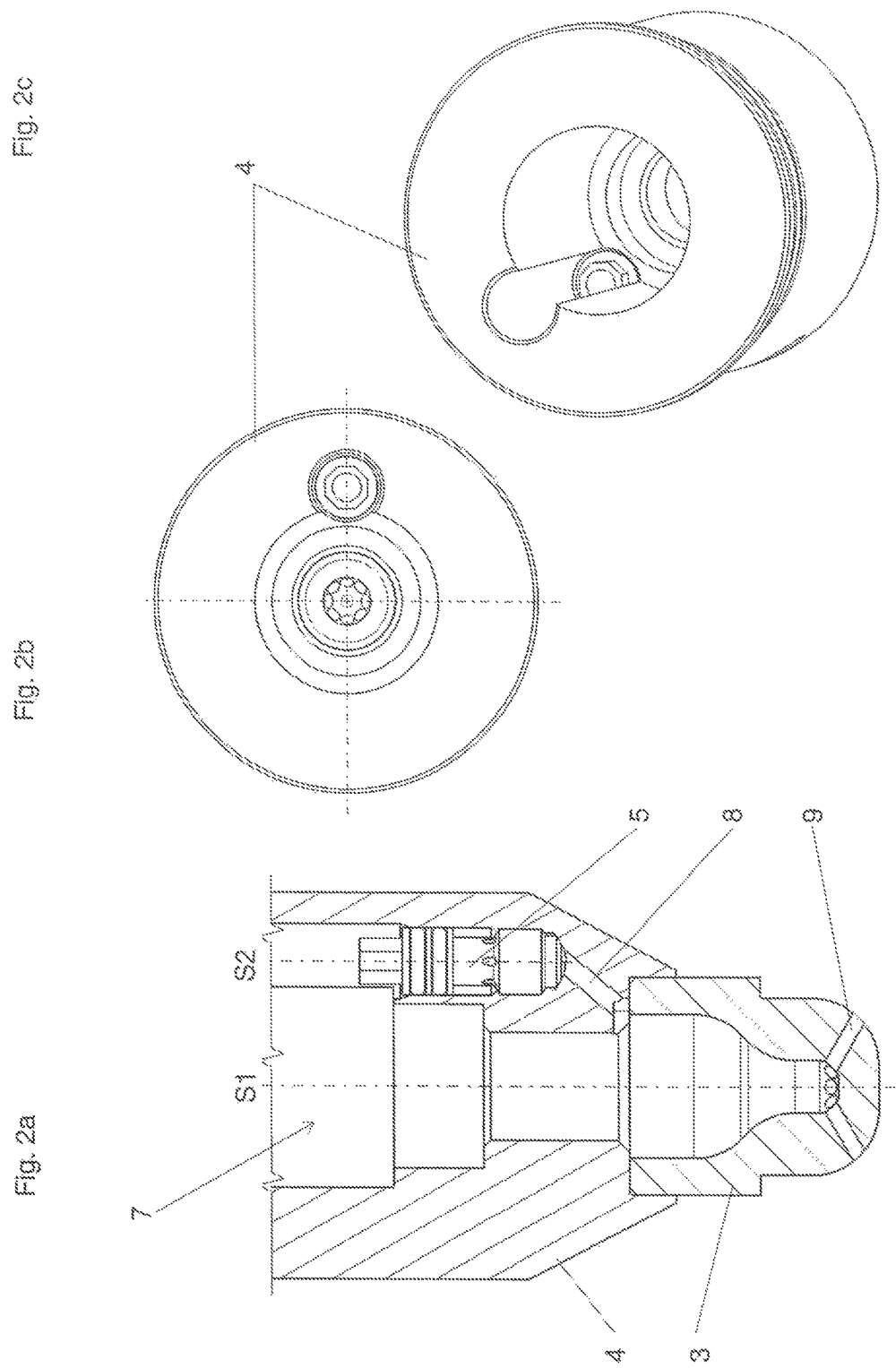

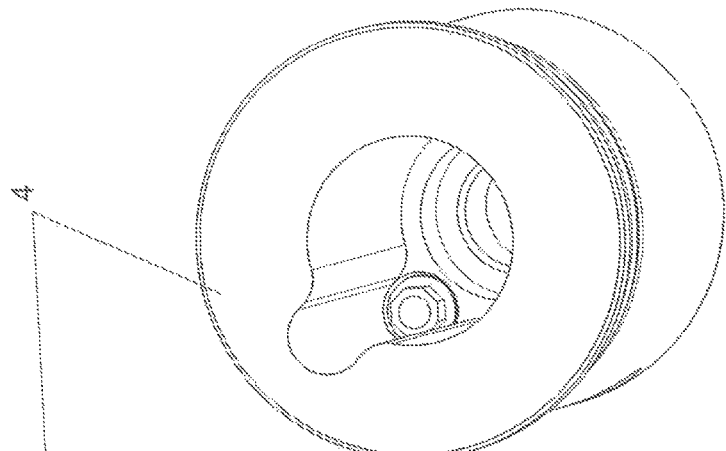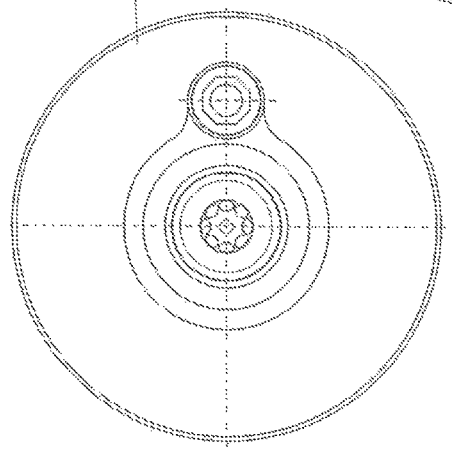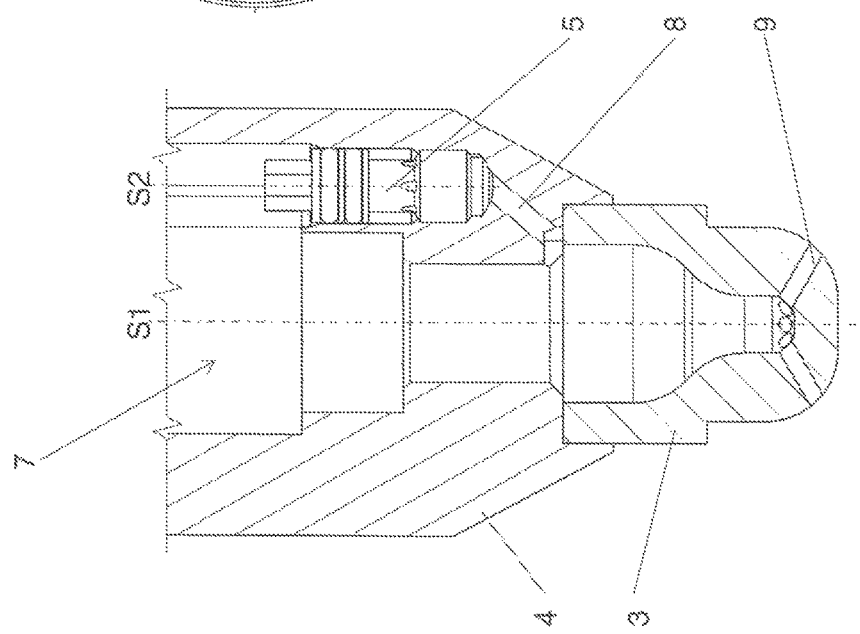

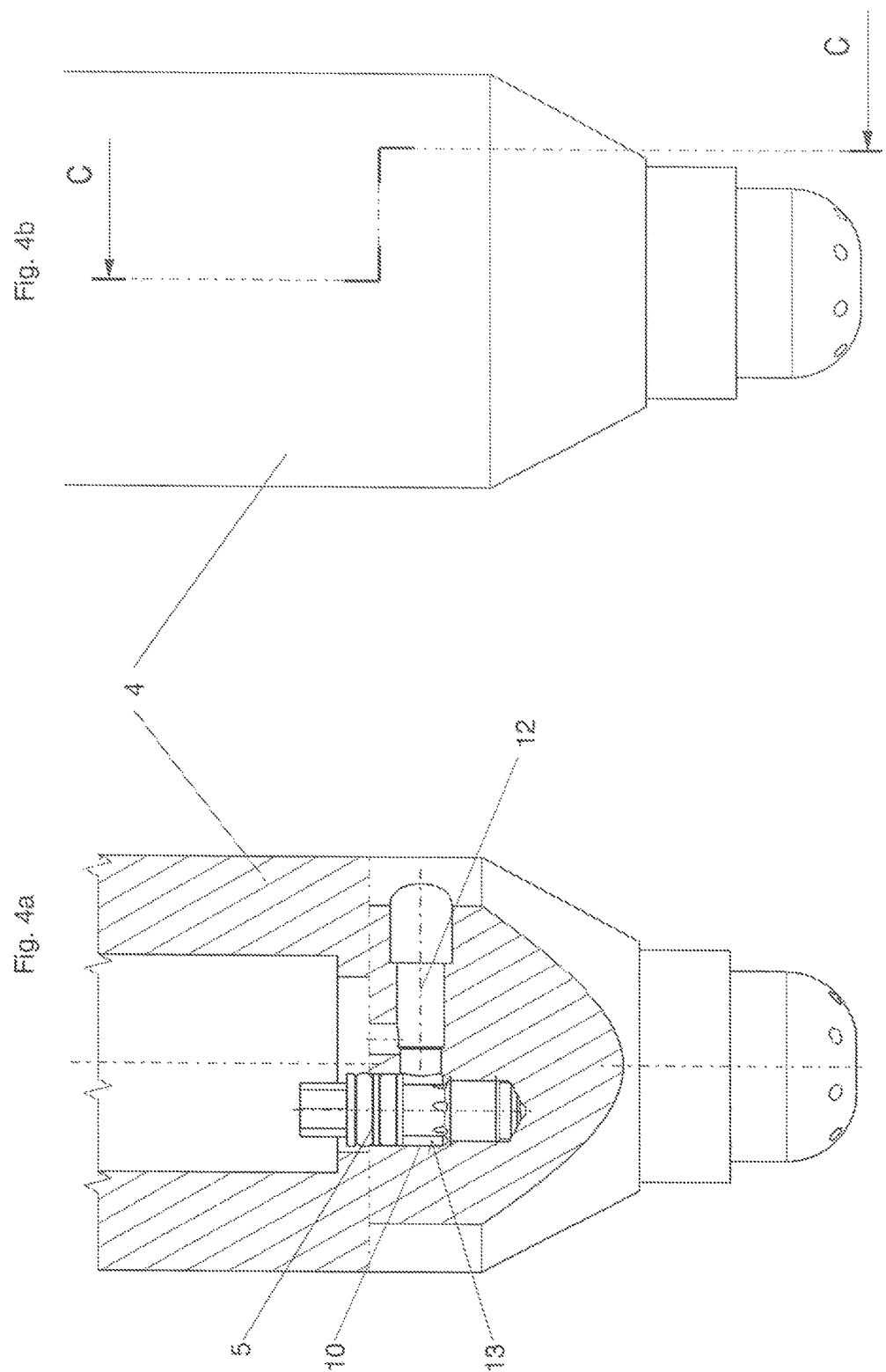

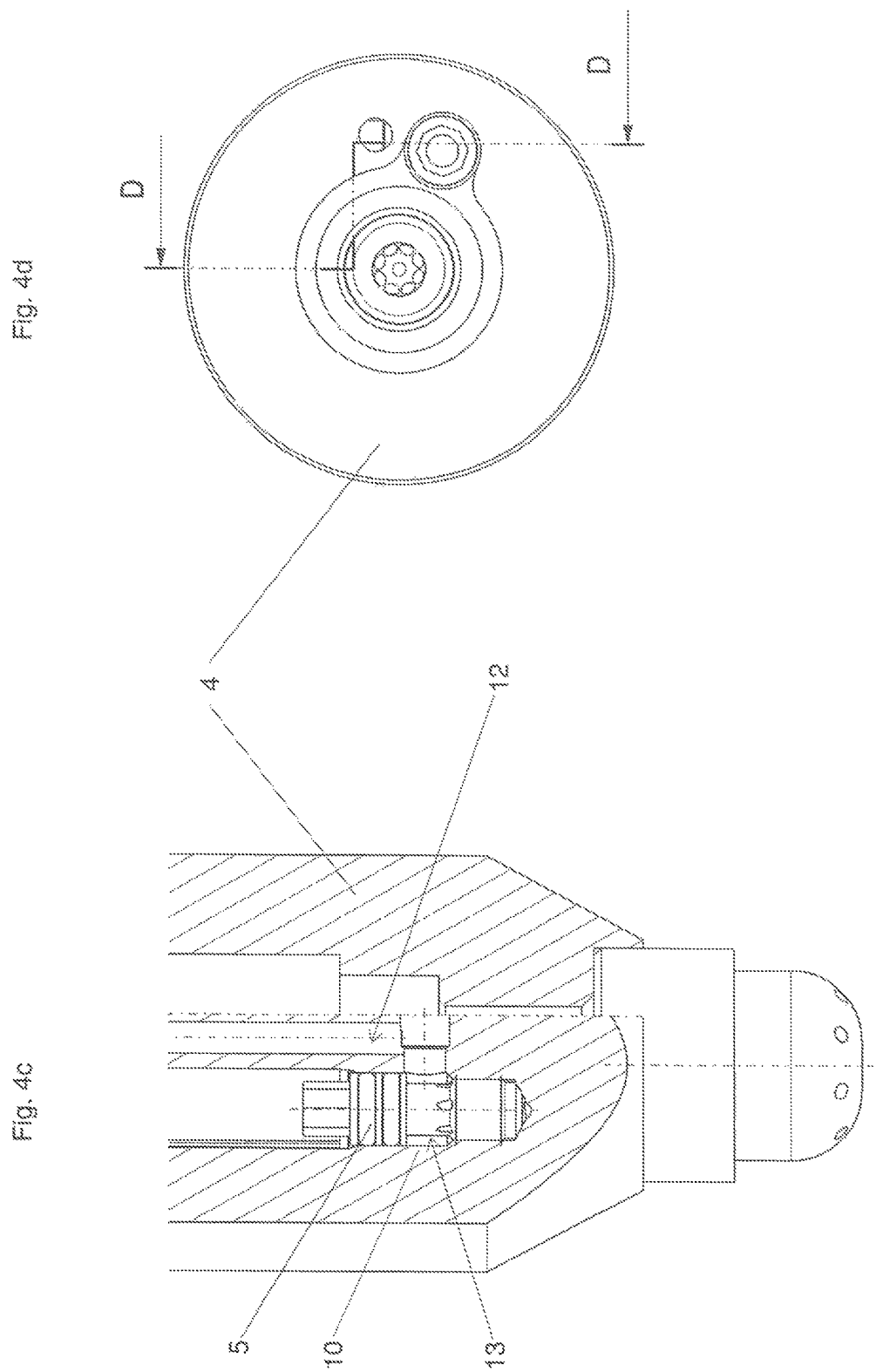

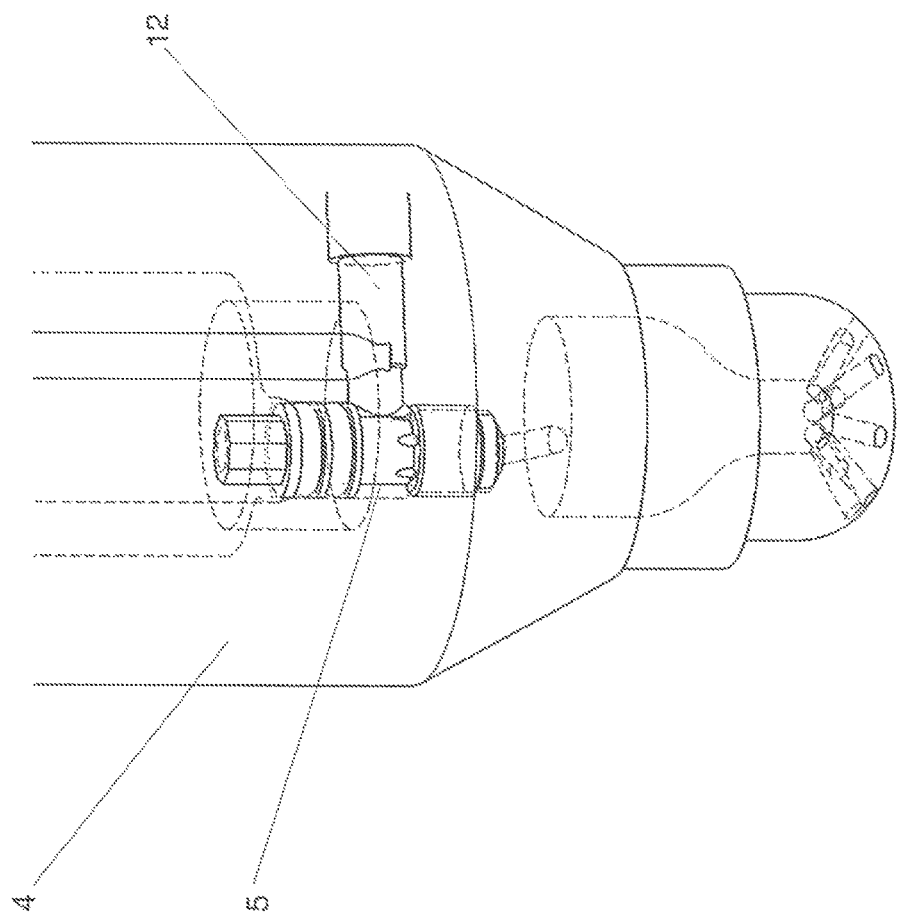

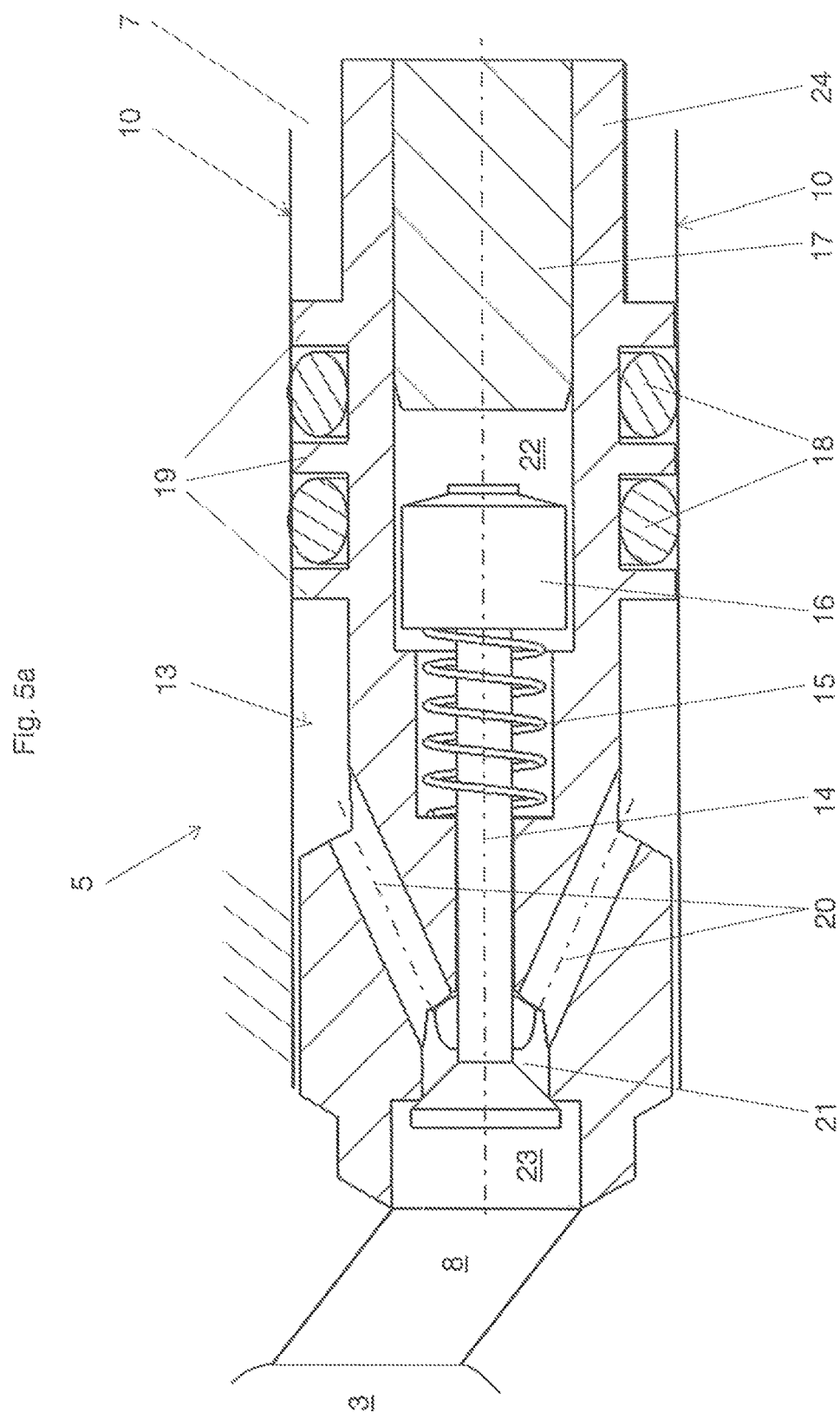

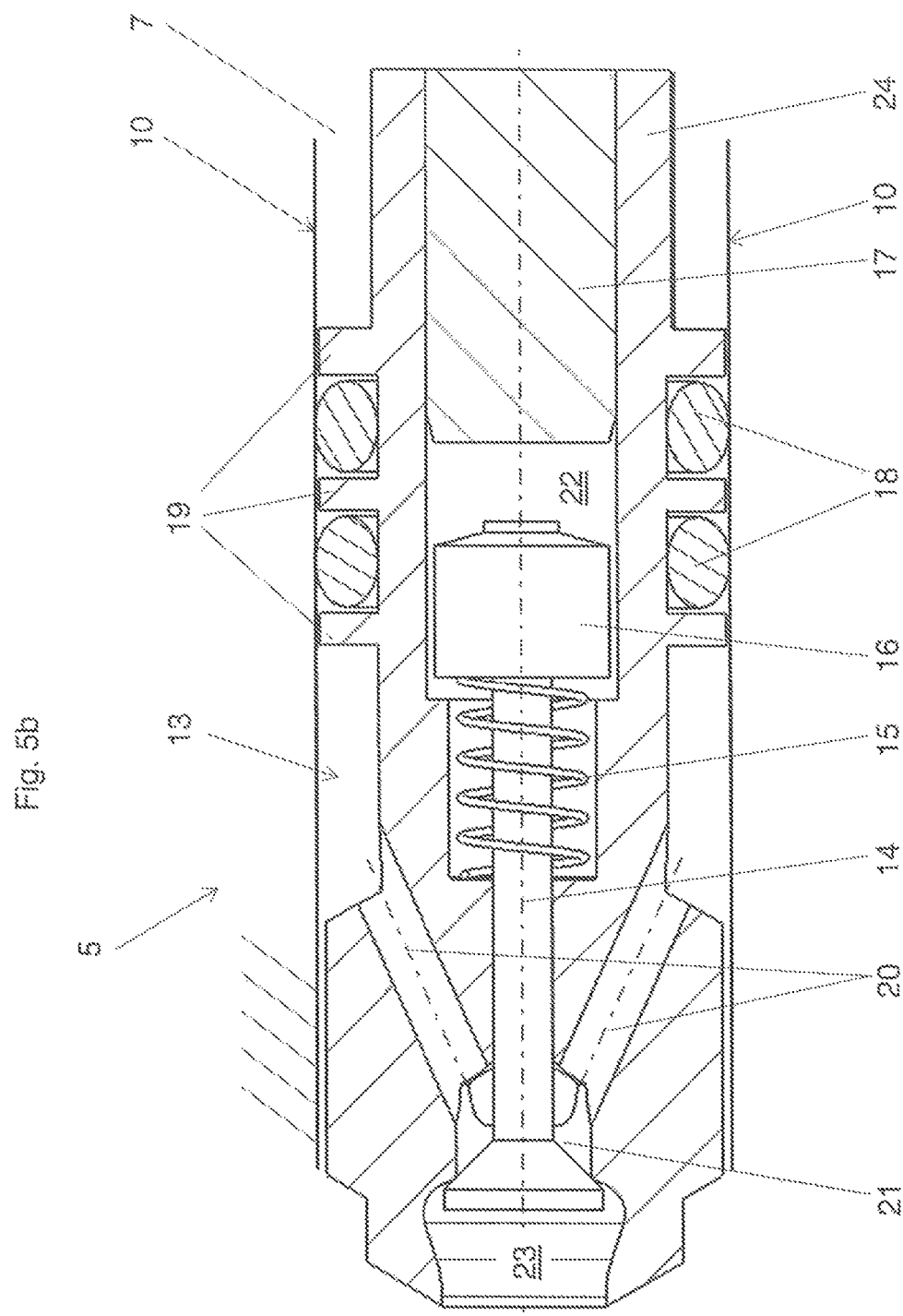

PRE-CHAMBER GAS VALVE

The invention concerns a pre-chamber gas valve having the features of the classifying portion of claim 1, and a process for producing such a pre-chamber gas valve.

As from a given bore (about 150 mm) internal (gas) combustion engines are fitted with a pre-chamber for ignition boosting. An ignition source which projects into the pre-chamber ignites the mixture which is present there and which is relatively rich in the case of a flushed pre-chamber, whereby ignition flares pass from the pre-chamber into a main combustion chamber and ignite the mixture present there.

There are various design concepts for supplying fuel to pre-chambers. In the case of non-flushed pre-chambers mixture is urged out of the main combustion chamber into the pre-chamber in the compression stroke.

In the case of flushed pre-chambers there is also the possibility of additionally supplying the pre-chamber with fuel. That separate fuel supply is effected by way of a pre-chamber gas valve. That valve can be arranged in the cylinder head directly or in a spark plug sleeve.

EP 0480545 (YANMAR DIESEL ENGINE CO) relating to the same general kind of subject-matter discloses a pre-chamber gas valve supplied with fuel gas by way of a passage (18). The structure comprises a plurality of concentric sleeve-shaped components which are fitted into each other. The gas feed is effected in part by way of deep bores in the walls of the sleeve-shaped components.

JPH 04171256 A shows a pre-chamber gas valve in which the upper cavity is built by a sleeve. In WO 2004/099584 A1 a pre-chamber gas valve is shown in which it cannot be seen in what manner the upper cavity in which the valve spring acts is closed.

U.S. Pat. No. 2,667,155 A teaches a pre-chamber cas valve in which the upper cavity is closed by a plug which is screwed into the valve body.

The object of the present invention is to provide a pre-chamber gas valve which is improved over the state of the art and a process for producing a pre-chamber gas valve.

That object is attained by a pre-chamber gas valve having the features of claim 1 and a process for the production thereof as set forth in claim 9 or claim 10. Advantageous configurations are recited in the depending claims.

According to the invention it is provided that a space in the valve body and in which a valve spring is arranged is closed by way of a pressed plug. That represents a substantial structural improvement over the state of the art. Pre-chamber gas valves known from the state of the art are closed by way of sleeves, which requires complicated and expensive production of steps for centering purposes.

It can be provided that for bracing the valve needle with respect to a valve seat, a cap is used which can be introduced into the valve body of the pre-chamber gas valve and which is connected to the valve needle.

Preferably it can be provided that the cap, in the opened condition of the pre-chamber gas valve, bears against the valve body. That entails the particular advantage that the movement of the valve needle has a well-defined end position. The abutment can preferably be formed in such a way that the upper space of the pre-chamber gas valve has at least two portions of differing diameter, wherein the cap is moveable in the portion of larger diameter and, when the open position of the pre-chamber gas valve is reached, the cap rests on the shoulder formed between the portion of larger diameter and the portion of smaller diameter. Desirably the valve spring is disposed in the portion of smaller diameter. In that way guidance is afforded for the valve spring in the portion of smaller diameter. In addition this ensures a particularly compact structure and ease of manufacture.

For the durability of the components (preferably at least the housing) they can be hardened. If the housing were of a two-part structure hardening would make welding more difficult. Any other joining procedure is difficult in terms of available space. The connection would have to be sealed and fixed. A one-part configuration for the housing is therefore preferred.

It can preferably be provided that the valve body is in one piece. That variant is particularly advantageous as the pre-chamber gas valve produced in that way is particularly robust. Expensive assembly steps are also dispensed with, in production.

It can be provided that guidance of the valve needle is effected by the valve body which at the same time also forms the housing of the pre-chamber gas valve. That provides a particularly advantageous component integration effect. The valve body therefore performs a plurality of functions.

It can be provided that between the seat of the valve head of the pre-chamber gas valve and the mouth opening of the pre-chamber gas valve into a pre-chamber or between the seat of the valve head of the pre-chamber gas valve and the mouth opening of the pre-chamber gas valve into a passage there is a space. It is preferably provided that that space is of a very substantially pear-shaped configuration narrowing towards the pre-chamber.

Protection is also claimed for processes for producing a pre-chamber gas valve.

In accordance therewith it is provided that to close the upper space a plug is connected to the valve body by means of a press connection.

Alternatively or additionally it is provided that a cap bracing the valve spring with respect to the valve seat is connected to the valve needle of the pre-chamber gas valve by beam welding.

The invention is illustrated in greater detail by the Figures in which:

FIGS. 1a through 1c is show a spark plug sleeve,
FIGS. 2a through 2c show a spark plug sleeve,
FIGS. 3a through 3c show a spark plug sleeve,
FIGS. 4a through 4e show details relating to the gas feed concept,
FIGS. 5a and 5b show a pre-chamber gas valve and a variant thereof.

FIGS. 1a through 1c show a spark plug sleeve 4 according to a first example in three views. The spark plug sleeve 4 is fitted into a cylinder head 2 in the installation condition.

Thus FIG. 1a shows a longitudinal section through the cavity 7 which accommodates a spark plug 6 (not shown) and a pre-chamber gas valve 5. The cavity 7 in this embodiment is provided in a spark plug sleeve 4.

The cavity 7 includes on the one hand a shaft which is concentric around the axis of symmetry S1, consisting of cylinder portions, for receiving a spark plug 6.

The cavity 7 further has a bore 10 with an axis of symmetry S2 for receiving a pre-chamber gas valve 5.

A passage 8 leads from the pre-chamber gas valve 5 to the pre-chamber 3. The pre-chamber 3 comprises on the one hand the actual cavity, that is to say the hollow space in which the ignition of mixture takes place. The pre-chamber 3 is of course also a physical component. In the present embodiment the pre-chamber 3 is in the form of a component separate from the spark plug sleeve 4 and is connected to the spark plug sleeve 4, for example by pressing.

The spark plug 6 which is not shown for the sake of clarity is introduced into the spark plug sleeve 4 by way of the shaft concentric with the axis of symmetry S1, in such a way that it terminates flush with the pre-chamber 3 and its electrodes project into the pre-chamber 3. The pre-chamber 3 is enriched with combustion gas by the pre-chamber gas valve 5 by way of the passage 8. After ignition in the pre-chamber 3 ignited mixture passes by way of the flow transfer bores 9 into the main combustion chamber (not shown).

FIG. 1b show a plan view of the view in FIG. 1a. It is possible to see the parallel cylindrical shafts disposed within the cavity 7 for receiving a spark plug 6 and a pre-chamber gas valve 5. The spark plug 6 is not shown, as explained with reference to FIG. 1a. It is possible to see in the pre-chamber gas valve 5 an octagon with which the pre-chamber gas valve 5 is screwed into the spark plug sleeve 4. In the present embodiment there is a largest bore diameter D1 of the cavity 7, which in a plan view circumscribes the bores for receiving the spark plug 6 and the pre-chamber gas valve 5. In other words, in this embodiment, there is a common shaft for spark plug 6 and pre-chamber gas valve 5. The center line of that largest bore of the diameter D1 is between the axes of symmetry S1 and S2. The common shaft has advantages in terms of mounting of the spark plug 6 and the pre-chamber gas valve 5, but weakens the spark plug sleeve 4 as there is only little wall thickness remaining.

FIG. 1c shows a perspective view of the spark plug sleeve 4 of this embodiment.

FIGS. 2a through 2c show various views of a spark plug sleeve 4 in accordance with a further embodiment.

While in the embodiment of FIGS. 1a through 1a the cavity 7 has a cylindrical portion which at its largest diameter circumscribes both the bore for receiving the spark plug and also the bore for receiving the pre-chamber gas valve 5, in the present embodiment the largest diameter of the cavity 7 no longer entirely embraces the bore of the spark plug sleeve 4. Rather, the bore 10 of the pre-chamber gas valve 5 passes through the spark plug bore 11 in the upper portion thereof, of the largest diameter. That will be particularly clearly apparent from the view in FIGS. 2b and 2c. In a plan view (FIG. 2b) therefore the bore 10 for receiving the pre-chamber gas valve 5 and the bore for receiving the spark plug 6 overlap.

FIGS. 3a through 3c show a further example. Here the bore for receiving the pre-chamber gas valve 5 is also not circumscribed by a largest diameter of the cavity 7. In other words, here too the bores for receiving a spark plug 6 and for receiving the pre-chamber gas valve 5 pass through each other. In comparison with the embodiment shown in FIGS. 2a through 2c here the contour of the cavity 7 is altered. Here the contour of the cavity 7 is of such a configuration that the cylindrical bores for receiving the spark plug 6 and the pre-chamber gas valve 5 blend fluidly into each other. In other words, the sharp transitions of the embodiment of FIGS. 2a through 2c are here replaced by a smooth radius in the transition of the two bores.

FIG. 4a shows a section through a spark plug sleeve 4, wherein the section was so positioned that the gas feed to the pre-chamber gas valve 5 is clearly illustrated. The section line is sketched in FIG. 4b. It is possible to see the gas feed passage 12 as it opens into the bore 10 carrying the pre-chamber gas valve 5. The bore 10 together with the pre-chamber gas valve 5 forms an annular passage 13 into which the gas feed passage 12 opens. From the annular passage 13 formed by the bore 10 and the pre-chamber gas valve 5, the inflowing gas is guided uniformly into the pre-chamber gas valve 5.

FIG. 4c shows a longitudinal section through the spark plug sleeve 4. The section line can be seen from FIG. 4d. As can be seen from FIG. 4c the sectioning is here so selected that it is also possible to see the part of the gas feed passage 12, that extends parallel to the axis of symmetry S1.

FIG. 4e is an isometric perspective view showing the arrangement of the pre-chamber gas valve 5 and its gas supply. The gas supply is afforded by the horizontal and the vertical portions of the gas feed passage 12.

FIG. 5a shows a sectional view of the pre-chamber gas valve 5. It is possible to clearly see the annular passage 13 formed between the wall 10 of the cavity 7 and the outside contour of the pre-chamber gas valve 5. The wall 10 can be formed either by the cylinder head 2 itself or by a spark plug sleeve 4 fitted into the cylinder head 2.

The valve needle 14 is braced against its seat by the spring 15. The cap 16 embraces the spring 15 and is connected to the valve needle 14. The connection can preferably be done by beam welding.

The present embodiment shows the particularly preferred situation in which the cap 16 bears against the valve body 24 in abutment relationship in the opened condition of the pre-chamber gas valve 5. That entails the particular advantage that the movement of the valve needle 14 has a well-defined end position. For that purpose the upper space 22 of the pre-chamber gas valve 5 is subdivided into two cylindrical portions of different diameter. The cap 16 is moveable in the direction of the longitudinal axis of the pre-chamber gas valve 5 to the right in the present Figure, that is to say in the direction of the plug 17. When the open position of the pre-chamber gas valve 5 is reached the cap 16 is in abutment relationship with the shoulder formed between the portion of larger diameter and the portion of smaller diameter in the space 22. The valve spring 15 is disposed in the portion of the space 22 of smaller diameter. The plug 17 closes the space 22 and seals off the pre-chamber gas valve 5 upwardly. Here the plug 17 is connected with the valve body 24 by a press fitting. The valve body 24 extends in one piece starting from the valve seat in the cylinder head 2 to the end (of the pre-chamber gas valve 5) facing away from the valve seat.

A further space 21 is provided immediately in front of the valve seat. The space 21 is supplied with gas by the passages 20 extending from the annular gap 13.

A further space 23 is disposed between the seat of the valve head of the pre-chamber gas valve 5 and the mouth opening of the pre-chamber gas valve 5 into a pre-chamber 3 or between the seat of the valve head of the pre-chamber gas valve 5 and the mouth opening of the pre-chamber gas valve 5 into a passage 8. Being cylindrical in the present Figure the space 23 can also assume other shapes. It can for example be of a pear-shaped configuration.

Sealing of the annular passage 13 in relation to the cavity 7 is effected radially by way of the O-rings 18. They are arranged in the annular receiving means formed by the projections 19. The sealing concept of the pre-chamber gas valve 5 shown here therefore provides that sealing of the pre-chamber gas valve 5 is effected radially, that is to say by way of the outside surface of the pre-chamber gas valve 5.

The flank of the projection 19, that faces towards the annular passage 13, also delimits the annular passage 13. The projection 19 therefore on the one hand performs the function of providing a receiving for a sealant, here in the form of an O-ring, while on the other hand the projection 19 also delimits the annular passage 13.

FIG. 5b shows a variant of FIG. 5a in which the space 23 is of a very substantially pear-shaped configuration narrowing towards the pre-chamber 3. That configuration is particularly advantageous from the fluidic point of view.

LIST OF REFERENCES USED 1 internal combustion engine
2 cylinder head
3 pre-chamber
4 spark plug sleeve
5 pre-chamber gas valve
6 spark plug
7 cavity
8 passage
9 flow transfer bore
10 wall of the cavity 7
11 spark plug bore
12 gas feed passage
13 annular passage
14 valve needle
15 valve spring
16 cap
17 plug
18 O-ring
19 projection
20 gas passage
21 lower cavity of the pre-chamber gas valve
22 upper cavity of the pre-chamber gas valve
23 space
24 valve body
S1 axis of symmetry
S2 axis of symmetry

The invention claimed is:

1. A pre-chamber gas valve comprising:
   a valve body;
   at least one valve spring;
   at least one valve needle connected to a cap; and
   an annular passage defined by the valve body and a wall of a spark plug sleeve or a cylinder head, with the annular passage fluidly connected to a lower space;
   wherein the valve body comprises the lower space supplied gas in an operating condition, and an upper space housing the at least one valve spring; and
   wherein an upper space is closed by a pressed plug arranged adjacent the cap within the upper space opposite the at least one valve needle connection to the cap, and in an operating condition supplying gas to the lower space, the cap is stopped from longitudinal movement in a direction opposite the plug by abutment against the valve body.

2. The pre-chamber gas valve as set forth in claim 1, wherein the valve body is configured as one piece extending longitudinally from defining the lower space to an opposed end for pre-chamber gas valve arrangement within the spark plug sleeve or within the cylinder head.

3. The pre-chamber gas valve as set forth in claim 1, wherein the at least one valve needle is connected via a weld to the cap.

4. The pre-chamber gas valve as set forth in claim 1, wherein the valve body is in one piece.

5. The pre-chamber gas valve as set forth in claim 4, wherein longitudinal movement of the valve needle is guided by the valve body.

6. The pre-chamber gas valve as set forth in claim 1, wherein the lower space opens into a pre-chamber or into a passage to the pre-chamber.

7. The pre-chamber gas valve as set forth in claim 6, wherein the lower space is of a substantially pear-shaped configuration which narrows in a direction towards the pre-chamber.

8. The pre-chamber gas valve as set forth in claim 1, further comprising at least one projection with a first side defining a side of the annular passage and a second side, opposite the first side, abutting a sealant for sealing off passage between the pre-chamber gas valve and the spark plug sleeve or the cylinder head accommodating the pre-chamber gas valve.

9. A process for producing a pre-chamber gas valve comprising:
   a valve body;
   at least one valve spring;
   at least one valve needle connected to a cap; and
   an annular passage defined by the valve body and a wall of a spark plug sleeve or a cylinder head, with the annular passage fluidly connected to a lower space;
   wherein the valve body comprises the lower space supplied gas in an operating condition, and an upper space housing the at least one valve spring; and
wherein an upper space is closed by a pressed plug arranged adjacent the cap within the upper space opposite the at least one valve needle connection to the cap, and in an operating condition supplying gas to the lower space, the cap is stopped from longitudinal movement in a direction opposite the plug by abutment against the valve body,
the process comprising:
   constructing the valve body comprising the lower space operable to receive a supply of gas in the operating condition, and the upper space housing a portion of the at least one needle, the at least one valve spring, the cap, and the plug; and
   connecting the plug to the valve body by a press connection or a screw connection.

10. A process for producing a pre-chamber gas valve comprising:
   a valve body;
   at least one valve spring;
   at least one valve needle connected to a cap; and
   an annular passage defined by the valve body and a wall of a spark plug sleeve or a cylinder head, with the annular passage fluidly connected to a lower space;
   wherein the valve body comprises the lower space supplied gas in an operating condition, and an upper space housing the at least one valve spring; and
wherein the upper space is closed by a pressed plug arranged adjacent the cap within an upper space opposite the at least one valve needle connection to the cap, and in an operating condition supplying gas to the lower space, the cap is stopped from longitudinal movement in a direction opposite the plug by abutment against the valve body,
the process comprising:
   arranging the at least one valve spring for biasing the at least one valve needle to abut a valve seat, wherein the at least one valve needle of the pre-chamber gas valve is connected to the cap via a weld.

* * * * *